UNITED STATES PATENT OFFICE.

MILTON C. WHITAKER AND FLOYD J. METZGER, OF NEW YORK, N. Y.

WATER-SOLUBLE COFFEE EXTRACT.

1,123,827. Specification of Letters Patent. Patented Jan. 5, 1915.

No Drawing. Application filed July 19, 1912. Serial No. 710,485.

*To all whom it may concern:*

Be it known that we, MILTON C. WHITAKER and FLOYD J. METZGER, citizens of the United States, residing at New York city, county and State of New York, (post-office address, Broadway and One Hundred and Sixteenth street, New York city, New York,) have invented a new and useful Improvement in Water-Soluble Coffee Extract, of which the following is a specification.

This invention relates to the production of a water soluble coffee extract; and more particularly to the production of a water soluble extract in the form of cakes or tablets which contain substantially all of the essential oils and aroma and also the water soluble principles of the coffee but from which all or substantially all of the caffein has been removed. The novel product accordingly is a water soluble extract possessing the aroma, taste and other properties, and containing the principal constituents of roasted coffee except caffein in a concentrated and convenient form for use.

In producing the novel extract of the present invention, roasted coffee berries are ground and the aromatic volatile constituents are removed by distillation with superheated steam. Thereafter caffein is removed from the coffee by extraction with solvents in a novel and advantageous manner; and after the extraction of the caffein, the remaining water soluble constituents are extracted with water and the various extracts concentrated and recombined to give the final product.

The invention is further illustrated by the following and more detailed description: Roasted and ground coffee is placed in a vessel and maintained at a temperature above 100° C., while steam is passed through it for some time, generally for about one hour. By the use of dry steam in this manner the volatile constituents of the coffee containing the aroma are removed without moistening the ground coffee and thereby dissolving tannin, etc. The steam containing the aroma is condensed and contains the essential oils in solution. These oils can be extracted from the water solution by a suitable solvent such as ether, chloroform, etc., and by slow evaporation of these solvents the oils can be obtained; or the ether solutions or extracts so obtained can be added to the extract hereinafter referred to and the ether then evaporated, leaving the oils in the extract. The oils obtained in this way contain the aroma or aromatic volatile constituents of the coffee. After removing the above mentioned volatile constituents, the coffee is slightly moistened by treatment with wet steam or with water until it has absorbed from 10 to 15 per cent., its appearance, however, remaining unchanged and not enough moisture being added to give to the coffee a feeling of wetness. By this treatment with water, the subsequent extraction of the caffein is materially facilitated. The coffee thus moistened is extracted with chloroform or other caffein solvent until all or substantially all of the caffein has been removed. This extraction is much more complete and is effected more readily than when these same solvents are used with the unmoistened and dry coffee. When the extraction is complete the solvent is distilled off and can be used again. The caffein is then taken up with water and thus separated from any oils, etc., which may have been extracted with it. These oils, etc., either before or after evaporation of the water are returned to the extraction vessel or to the extract obtained therefrom. The caffein can be obtained from its solution by evaporation of the solvents. If desired the coffee from which the caffein has been removed can be freed from traces of the solvent used for extraction by a brief treatment with superheated steam if desired; and extraction of the remaining water soluble constituents is then effected by hot water. This hot water removes from the coffee all of the desired constituents which are soluble in water and which have not been previously removed. The extract is filtered off from the ground coffee and evaporated to dryness in a vacuum. Any oil or other constituents recovered from the caffein extract can be added to the water soluble extract either before or after its evaporation. After evaporation the solid dry extract obtained is ground to a powder and the essential oils above referred to are added to it. As already indicated, they may be added as such or in the form of an ether solution from which, after addition, the ether is removed.

In this way there is obtained a water soluble coffee extract containing all or substantially all of the water soluble ingredients of roasted coffee but without the caffein which has been removed. It differs in its mode of preparation and in its constituents from any of the coffee extracts heretofore known since it is free from caffein and otherwise contains all or substantially all of the valuable ingredients of coffee prepared in a novel and highly advantageous manner. The dried product with which the aroma or essential oils have been recombined can be pressed into tablets or cakes or used in its granular form and in such form require merely the addition of hot water for the preparation of caffein free coffee which otherwise possesses the properties and taste of coffee made from roasted and ground coffee berries.

Having now described our invention and in what manner the same is to be performed, what we claim as new and desire to secure by Letters Patent is:

1. The process of producing a water soluble coffee extract which comprises removing volatile constituents from roasted coffee, extracting caffein therefrom, extracting the remaining water soluble ingredients and combining such ingredients with the volatile constituents.

2. The process of producing a water soluble coffee extract which comprises subjecting roasted coffee to steam distillation with dry steam to remove volatile constituents, removing from the extracted coffee caffein, extracting the caffein freed coffee with water, and combining the constituents of the steam and water extraction processes.

3. The process of producing a water soluble coffee extract which comprises removing volatile constituents from roasted coffee by dry steam distillation, extracting caffein therefrom by treatment with an organic caffein solvent, extracting the remaining water soluble ingredients by treatment with hot water, evaporating said last mentioned solution, and combining the dried product thereof, with the previously obtained volatile constituents.

4. The process of producing a water soluble coffee extract which comprises subjecting roasted coffee to steam distillation with dry steam to remove volatile constituents, moistening the coffee, extracting caffein therefrom by means of an organic caffein solvent, extracting the caffein freed coffee with water and combining the constituents of the steam and water extraction processes after evaporation to produce a solid coffee extract.

5. A concentrated water soluble extract of roasted coffee, substantially free from caffein.

6. A concentrated water soluble coffee extract, substantially free from caffein, comprising the water soluble and the volatile constituents of roasted coffee.

7. A solid water soluble coffee extract substantially free from caffein which, by the addition of water, furnishes a coffee beverage.

8. A solid water soluble coffee extract substantially free from caffein which, by the addition of water, furnishes a beverage characterized by containing all the other ingredients and possessing the aroma and taste of the ordinary coffee beverage.

9. A water soluble coffee extract substantially free from caffein, consisting of a solid and dry portable ration containing all the other constituents of the ordinary coffee beverage which, on dissolving in water, will produce a cup of coffee.

10. A water soluble coffee extract substantially free from caffein, consisting of a solid cubical ration containing all the other constituents of the ordinary coffee beverage which, on dissolving in water, will produce a cup of coffee.

11. A water soluble solid extract of roasted coffee, substantially free from caffein.

12. A water soluble solid extract of roasted coffee substantially free from caffein, comprising the water soluble and the volatile constituents of roasted coffee.

In testimony whereof, we have hereunto set our hands in the presence of two subscribing witnesses.

MILTON C. WHITAKER.
FLOYD J. METZGER.

Witnesses:
FREDERIC W. ERB,
CHARLES F. CLAAR.